United States Patent [19]

McDaniel et al.

[11] 4,439,543
[45] Mar. 27, 1984

[54] CO REDUCED CHROMYL HALIDE ON SILICA CATALYST

[75] Inventors: Max P. McDaniel, Bartlesville; Phil M. Stricklen, Ochelata, both of Okla.

[73] Assignee: Phillips Petroleum Company, Bartlesville, Okla.

[21] Appl. No.: 405,486

[22] Filed: Aug. 5, 1982

[51] Int. Cl.$^3$ .............................................. C08F 4/24
[52] U.S. Cl. ................................... 502/228; 526/106
[58] Field of Search ........................................ 252/441

[56] References Cited

U.S. PATENT DOCUMENTS 3,346,511 10/1967 Hill ...................................... 252/455
3,412,040 11/1968 Saccardo et al. ............... 252/441 X
3,535,297 10/1970 Carrick et al. ...................... 252/467
4,248,735 2/1981 McDaniel et al. .............. 252/441 X
4,252,928 2/1981 Eve ...................................... 526/106

Primary Examiner—Patrick Garvin

[57] ABSTRACT

A silica composition is calcined at a temperature high enough to remove some but not all of the hydroxyl content. Generally temperatures of at least 400° C. are required and temperatures above 1000° C. are undesirable, the most preferred temperature being about 600°–800° C. The thus calcined silica is then treated with chromyl chloride at an elevated temperature and finally given a treatment in a carbon monoxide ambient. While the final composition contains chlorine which is normally considered a catalyst poison, the material is surprisingly active as an olefin polymerization catalyst.

19 Claims, No Drawings

CO REDUCED CHROMYL HALIDE ON SILICA CATALYST

BACKGROUND OF THE INVENTION

This invention relates to chromium-containing olefin polymerization catalysts.

Efforts have been made for some time to prepare catalysts utilizing chromyl chloride ($CrO_2Cl_2$). Chromyl chloride can be reacted for instance with a substrate such as silica containing a large number of closely spaced (paired) $OH^-$ groups so that each chromium becomes attached to the surface through two oxygen links.

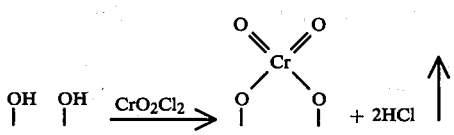

Silicas calcined at 400° C. or below provide such a support. However, these materials exhibit poor activity as olefin polymerization catalysts due to the low calcining temperature which leaves a high background $OH^-$ population. A secondary calcining step in air at 800° C. yields an ordinary Cr/silica catalyst, well known in the prior art, giving good activity, a high MI potential, and a relatively narrow molecular weight distribution.

On the other hand if the silica substrate is first calcined at a high temperature such as 800° C., and then treated with chromyl chloride, a relatively inactive catalyst still results. This time only widely spaced $OH^-$ groups remain (singles) and these react to yield the monochloride species, attached to the surface through only one oxygen link.

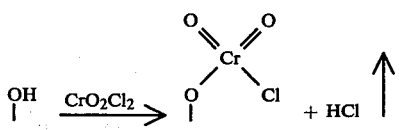

Apparently the chloride in this species renders it inactive. Again a secondary calcining step at 800° C. provides ordinary prior art catalysts by burning off the chloride.

SUMMARY OF THE INVENTION

It is an object of this invention to provide a silica supported chromyl chloride olefin polymerization catalyst giving good productivity; and It is yet a further object of this invention to provide a catalyst capable of giving high molecular weight polymer.

It is yet a further object of this invention to provide a catalyst capable of giving broad molecular weight distribution polymer.

In accordance with this invention, a silica calcined at high temperature is treated with a chromyl halide selected from chromyl chloride, chromyl fluoride or chromyl fluorochloride and thereafter reduced with carbon monoxide.

DESCRIPTION OF THE PREFERRED EMBODIMENTS

The support utilized in accordance with this invention is silica gel which is sometimes referred to as catalytic grade silica. Such silica can easily be produced by combining an alkali metal silicate with an acid to form a hydrogel. The hydrogel is then washed and water removed by azeotropic distillation or by spray drying, for instance to produce a xerogel. Such materials invariably contain surface $OH^-$ groups, generally about 4.5 $OH^-$ groups/$nm^2$. The silica frequently will contain minor amounts of other materials such as alumina and thoria. It can contain up to 20 weight percent of at least one of alumina, thoria, boria, titania and zirconia, and the term "silica material" as used herein is meant to encompass such mixtures.

It is essential to the invention to properly precondition the silica to remove some, but not all, of the $OH^-$ groups prior to reaction with the chromyl halide. This requires treating the silica in an oxidizing ambient such as air at a temperature within the range of about 400°-1000° C., preferably 600°-950° C., more preferably 600°-800° C. which reduces the $OH^-$ population to about 0.9 to 1.4/$nm^2$. While applicants do not wish to be bound by theory, it appears that the residual $OH^-$ population can be detrimental to the catalyst and below about 400° C. this background $OH^-$ population is too high for a reasonable activity. Thus, it is necessary to heat to at least this temperature in order to avoid having excessive amounts of residual hydroxyls. On the other hand, above 950° C. sintering begins to occur and also the $OH^-$ population is reduced to the point where an insufficient amount of chromium can attach. The best results are obtained at about 600°-800° C. Time for this treatment can vary widely with longer times generally being used at the lower temperatures but generally will be 10 minutes to 20 hours, preferably 2 to 5 hours.

The preferred chromyl halide is chromyl chloride ($CrO_2Cl_2$). Also included are chromyl fluoride ($CrO_2F_2$) and chromyl fluorochloride ($CrO_2FCl$).

Since it would not be desirable to contact a chromyl halide with oxygen at an elevated temperature, the adsorbed oxygen is preferably at least partially removed from the silica after the calcining and prior to the introduction of the chromyl halide. This can be done in any convenient manner such as flushing with an inert gas such as argon, nitrogen or carbon dioxide or by utilizing a vacuum. Preferably, an inert gas such as argon or nitrogen is used and passed through the silica in the form of a fluidized bed.

Conventional activation equipment such as a continuous activator or a fluidized bed can be utilized. Chromyl halide can be contacted with the silica by means of any convenient method, however, it is most convenient simply to utilize chromyl halide vapor either alone or diluted with an inert gas (carrier). One particularly convenient method is to dissolve the chromyl halide in an innocuous liquid such as carbon tetrachloride which is volatile under the temperature employed so as to provide a more convenient method of metering the chromyl halide into contact with the silica. Thus, one convenient temperature range is 118° C. (the boiling point of chromyl chloride) to about 300° C. when $CCl_4$ is present. In the absence of $CCl_4$, a temperature of up to about 400° C. can be used. However, temperatures below the boiling point can be utilized since, of course, chromyl halide vapors can exist at a temperature below the boiling point thereof. Hence, a temperature of about 100°–400° C. can be utilized. Preferably, the temperature is about 150°–300° C. The time for the treatment can vary widely, for instance from 1 minute to 10 hours, preferably 10 minutes to 5 hours, more preferably 0.25 to 1 hour.

After the chromyl halide is contacted with the silica, the thus-treated silica is given a carbon monoxide treatment. This treatment can take place for a time period within the range of 1 minute to 10 hours, preferably 10 minutes to 5 hours, more preferably 0.25 to 1 hour. The carbon monoxide ambient can be pure carbon monoxide or the carbon monoxide can be diluted with an inert gas such as nitrogen. Suitable temperatures are 200°–600° C., preferably 250°–450° C.

The final product obtained with this treatment will contain both chromium and halide in addition to the silica. Preferably, the atom ratio of chromium to halide will be in the neighborhood of 1:1 prior to the carbon monoxide treatment and, while some halide will be lost during the carbon monoxide treatment, the final catalyst will generally have an atom ratio of chromium to halide within the range of 1:1 also or at most a ratio of 1:0.5.

The final catalyst will have from 0.1 to 10, preferably from 0.5 to 2, more preferably 0.5 to 1.2 weight percent chromium based on the weight of the final silica base. Thus, at the preferred 1:1 atom ratio of chromium to halide and the preferred 0.5 to 2 weight percent range of chromium on silica, it can be seen that there would be about 0.1 to 0.4 gram milliatoms of chlorine per gram of catalyst. The amounts for the broader ranges can easily be calculated since one weight percent chromium is about 0.2 mmoles (milliatoms) per gram of catalyst.

The catalyst of this invention can be used to polymerize at least one mono-1-olefin containing 2 to 8 carbon atoms per molecule. The invention is of particular applicability in producing ethylene homopolymers and copolymers from mixtures of ethylene and 1 or more comonomers selected from 1-olefins containing 3 to 8 carbon atoms per molecule. Exemplary comonomers include aliphatic 1-olefins, such as propylene, 1-butene, 1-hexene, and the like and conjugated or nonconjugated diolefins, such as 1,3-butadiene, isoprene, piperylene, 2,3-dimethyl-1,3-butadiene, 1,4-pentadiene, 1,5-hexadiene, and the like and mixtures thereof. Ethylene copolymers preferably constitute at least about 90, preferably 95 to 99 mole percent polymerized ethylene units. Ethylene monomer and ethylene with propylene, 1-butene, and 1-hexene are especially preferred.

The polymers can be prepared from the activated catalysts of this invention by solution polymerization, slurry polymerization, and gas phase polymerization techniques using conventional equipment and contacting processes. However, the catalysts of this invention are particularly suitable in slurry polymerizations. The slurry process is generally carried out in an inert diluent such as a paraffin, aromatic or cycloparaffin hydrocarbon. For predominantly ethylene polymers, a polymerization temperature of about 66°–110° C. is employed.

EXAMPLE I

A catalyst was prepared from particulate catalytic grade silica (Davison 952 grade silica) and chromyl chloride by the following procedure. About 50 mL of the silica (about 10 g) was conditioned under fluidizing conditions (e.g., 42 L/hour gas at STP) in a quartz tube with dry air for 3 hours at 600° C. The product was cooled to room temperature (about 23° C.) in dry air. The next day the product was heated to 200° C. in argon under fluidizing conditions and over about a 45 minute period 2.0 mL of a 10 volume percent solution of $CrO_2Cl_2$ in $CCl_4$ was injected into the gas stream. The temperature was raised to 300° C. and fluidization continued for 30 minutes more. The recovered product was transferred to a foil covered flask containing dry air for storage.

Analysis of a portion of the treated product disclosed that it contained 0.142 mmole $Cr^{+6}$ per g and 0.097 mmole $Cl^-$ per g. It is believed that the treated silica contains a chromium compound having about a 1:1 Cr:Cl atom ratio singly attached to the silica surface through an oxygen atom, viz $\equiv Si-O-CrO_2Cl$.

Ethylene polymerization was conducted with an 0.1954 g portion of the catalyst in Run 1 in a stirred stainless steel reactor containing 1.25 lbs (567 g) of isobutane diluent at 225° F. (107° C.) and a total reactor pressure of 565 psia (3.89 MPa). In a 55 minute run, it was found that 10 g of polyethylene was made, giving a calculated productivity of 51 g polymer per g catalyst.

Another series of catalysts was prepared from the same silica source by calcining about 50 mL of the silica for 3 hours at 800° C. in dry air using the same fluidizing conditions as before. Dry nitrogen was substituted for the air and the product was cooled to 200° C. while maintaining fluidization. Over 25 minutes, 2 mL of the same $CrO_2Cl_2$ solution used before was injected into the gas stream. Following this, the product was fluidized for about 10 more minutes at 200° C. in nitrogen, then cooled to about 25° C. while under nitrogen and transferred to a foil covered flask containing dry air for storage.

Analysis disclosed the treated silica contained 0.24 mmole $Cr^{+6}$ per g and 0.22 mole $Cl^-$ per g. The treated silica contains a chromium compound having a 1:1 Cr:Cl atom ratio which is believed to be singly attached to the silica surface through an oxygen atom as before.

Ethylene polymerization was conducted as before with about 0.3 g portions of the treated silica except that a reactor temperature of 205° F. (96° C.) was used. In Run 2, no reactor adjuvant was present. In Run 3, 4 ppm triethylborane (TEB) based on the diluent weight was employed as a reactor adjuvant. In Run 4, 4 ppm triethylaluminum (TEA) was employed as a reactor adjuvant. The following abbreviations are used:

HLMI: High load melt index, ASTM D 1238-65T (Condition F).

Adjuvant: TEB or TEA as previously described.

Catalyst productivity: g/g cat, g polymer per g solid catalyst.

The results are reported in Table 1.

TABLE 1

Ethylene Polymerization, $CrO_2Cl_2$-Treated Silica, No CO Reduction

| Run No. | Catalyst Weight g | Run Time min. | Adjuvant Type (ppm) | Polymer Yield g | HLMI g/10 min | Catalyst Productivity g/g cat |
|---|---|---|---|---|---|---|
| 2 | 0.2815 | 40 | none | trace | — | — |
| 3 | 0.3090 | 60 | TEB(4) | 13 | 2.6 | 42 |
| 4 | 0.3105 | 120 | TEA(4) | 156 | 0.26 | 502 |

The results disclose that the catalyst (Run 2) in the absence of an adjuvant is barely active. In the presence of 4 ppm TEB (Run 3), the activity of the catalyst is slightly improved. In Run 4, using 4 ppm TEA, the activity of the catalyst is substantially improved but it is still too low for commercial use.

The high calcining temperatures used with the silica (600°–800° C.) substantially dehydroxylates the surface hydroxyl (hydroxy) population, resulting in a surface hydroxyl population of about 0.7 mmole or less per g silica. As a result, the $OH^-$ groups are reasoned to be relatively isolated and the chromium compound is more likely to attach itself to the silica surface through a single oxygen atom by reaction with an $OH^-$.

EXAMPLE II

Another series of catalysts was prepared from the previously described silica (952) by conditioning it by calcination in dry air at 600° C. in dry air for 3 hours and then flushed with argon as before. The resulting silica was then treated with the $CrO_2Cl_2$—$CCl_4$ solution at 300° C. for 30 minutes as before. The recovered product was calculated to contain 0.399 mmole Cr per gram and 0.354 mmole chloride per gram. Thus, the atom ratio of Cr:Cl was still about 1. The catalyst was treated with a $CO/N_2$ mixture at 300° C. for one-half hour, then cooled, recovered and stored under $N_2$ in the absence of oxygen. A portion of the catalyst (now blue gray) exposed to air and analyzed as before showed that it contained 0.214 mmole $Cr^{+6}$ and 0.207 mmole $Cl^-$ per gram.

Individual portions of the CO-treated catalyst were tested for ethylene polymerization under the conditions previously described. One run was conducted at 107° C. (225° F.) in the absence of any adjuvant. The other three runs were conducted at 96° C. as before. One was conducted in the absence of any adjuvant, the second was made in the presence of about 345 kPa (50 psi) of hydrogen and the third was made in the presence of 4 ppm TEB.

The results are given in Table 2.

TABLE 2

Ethylene Polymerization
$CrO_2Cl_2$-Treated Silica Reduced With CO As Catalyst

| Run No | Catalyst Wt. g | Run Time Min. | Adjuvant | Reactor Temp.°C. | Polymer g | g/g cat | MI[a] g/10 min | HLMI MI |
|---|---|---|---|---|---|---|---|---|
| 4 | 0.0565 | 55 | None | 96 | 320 | 5660 | 1.5 HLMI | — |
| 5 | 0.0480 | 60 | $H_2$ (50 psi) | 96 | 268 | 5580 | 0.04 | 210 |
| 6 | 0.0505 | 60 | TEB (4 ppm) | 96 | 197 | 3900 | 0.06 | 177 |
| 7 | 0.0665 | 60 | None | 107 | 318 | 4780 | 0.15 | 112 |

[a]Melt Index: ASTM D 1238-65T (Condition E).

The results show that the invention catalyst to be very active both in the absence or presence of the specified adjuvant unlike the control catalysts of Example I.

Based on many tests with prior art chromium oxide-silica catalysts containing about the same chromium content as in Run 7, such prior art catalysts would have a HLMI/MI ratio of 90 or below at the same 0.15 MI. Since the ratio is thought to be related to polymer molecular weight distribution (MWD), the greater the value the broader the MWD, polymers made in the presence of the invention catalyst unexpectedly show broad MWD relative to those made with prior art catalysts.

Although not wishing to be bound by theory, it is believed that reducing the $CrO_2Cl_2$-treated silica with CO according to the invention results in a singly attached reduced or divalent chromium compound having the structure $\equiv Si-O-Cr-Cl$ as opposed to the postulated $\equiv Si-O-CrO_2Cl$ hexavalent chromium structure before CO treatment.

While this invention has been described in detail for the purpose of illustration, it is not to be construed as limited thereby but is intended to cover all changes and modifications within the spirit and scope thereof.

We claim:
1. A method comprising:
   (1) treating a silica material having surface hydroxy groups in an oxygen containing ambient at a temperature sufficient to remove some but not all of said hydroxy groups;
   (2) contacting the thus-treated silica with a chromyl halide at an elevated temperature to give a silica composition having both chromium and halogen as a part thereof; and
   (3) thereafter contacting said chromium and halogen containing silica composition with an ambient comprising carbon monoxide at an elevated temperature to give a final silica composition containing both chromium and halogen.
2. A method according to claim 1 wherein said halogen is chlorine.
3. A method according to claim 2 wherein said silica is essentially pure silica produced by combining an alkali metal silicate and an acid to form a hydrogel which is thereafter dried to form a xerogel.
4. A method according to claim 2 wherein said treatment of (1) is carried out in air at a temperature within the range of 400°–1000° C.
5. A method according to claim 2 wherein said treatment of (1) is carried out in air at a temperature within the range of 600°–800° C.
6. A method according to claim 2 wherein said contacting with chromyl chloride is carried out by introducing vaporous chromyl chloride at a temperature within the range of about 100°–400° C. into contact with said silica material.
7. A method according to claim 2 wherein said chromyl chloride is added as a vapor in a gaseous carrier at a temperature of 150°–300° C.
8. A method according to claim 2 wherein said contacting with said carbon monoxide ambient is carried out at a temperature within the range of 250°–450° C.
9. A method according to claim 2 wherein said treatment with carbon monoxide is carried out at a temperature within the range of 250°–450° C. and wherein said carbon monoxide ambient is a mixture of carbon monoxide and a gaseous carrier.
10. A method according to claim 9 wherein said gaseous carrier is nitrogen.
11. A method according to claim 10 wherein said contacting with chromyl chloride is carried out by introducing vaporous chromyl chloride in a gaseous carrier at a temperature within the range of 150°–300°

C. into contact with said silica material and wherein said silica is treated at a temperature within the range of 600°–800° C., wherein said oxygen containing ambient is air, and wherein after said treatment said air is removed by flushing with an inert gas prior to said contacting with said chromyl chloride.

12. A composition produced by the method of claim 11.

13. A composition produced by the method of claim 1.

14. A method of producing an olefin polymerization catalyst comprising:

treating a silica containing composition with an oxygen containing ambient at a temperature within the range of 400°–1000° C. for a time within the range of 10 minutes to 20 hours;

thereafter contacting said thus treated silica with an ambient comprising $CrO_2Cl_2$ at a temperature within the range of 100°–400° C. for a time within the range of 1 minute to 10 hours; and thereafter contacting with a carbon monoxide containing ambient at a temperature within the range of 250°–450° C. for a time within the range of 1 minute to 10 hours.

15. A method according to claim 14 wherein said silica containing composition is a silica xerogel produced by combining a mineral acid and an alkali metal silicate and drying to remove water.

16. A method according to claim 15 wherein said oxygen containing ambient is air, wherein said chromyl chloride is introduced as vapor along with a gaseous carrier, and wherein said carbon monoxide ambient comprises carbon monoxide and an inert gaseous carrier.

17. A method according to claim 16 wherein said gaseous inert carrier is nitrogen.

18. A method according to claim 17 wherein said silica containing composition is produced by combining sodium silicate and a mineral acid to form a hydrogel and drying to form a xerogel.

19. A catalyst produced by the method of claim 18.

* * * * *

UNITED STATES PATENT AND TRADEMARK OFFICE
CERTIFICATE OF CORRECTION

PATENT NO. : 4,439,543
DATED : March 27, 1984
INVENTOR(S) : Max P. McDaniel and Phil M. Stricklen It is certified that error appears in the above-identified patent and that said Letters Patent are hereby corrected as shown below:

Column 8, line 1, claim 14, line 11, after "contacting" and before "with" should be --- the thus $CrO_2Cl_2$ contacted silica ---.

Signed and Sealed this

Fifteenth Day of April 1986

[SEAL]

Attest:

DONALD J. QUIGG

Attesting Officer    Commissioner of Patents and Trademarks